United States Patent [19]
Chen et al.

[11] Patent Number: 5,744,725
[45] Date of Patent: Apr. 28, 1998

[54] CAPACITIVE PRESSURE SENSOR AND METHOD OF FABRICATING SAME

[75] Inventors: Shiuh-Hui Steven Chen, Lake Zurich; Carl Ross, Mundelin, both of Ill.; Donald L. Hughes, Mesa, Ariz.

[73] Assignee: Motorola Inc., Schaumburg, Ill.

[21] Appl. No.: 780,428

[22] Filed: Jan. 8, 1997

Related U.S. Application Data

[63] Continuation of Ser. No. 228,626, Apr. 18, 1994, abandoned.

[51] Int. Cl.[6] .................................................. H01G 7/00
[52] U.S. Cl. ............................................................ 73/724
[58] Field of Search .............................. 73/718, 721, 724; 361/283.1, 283.3, 283.4; 156/189

[56] References Cited

U.S. PATENT DOCUMENTS

| | | | |
|---|---|---|---|
| 3,634,727 | 1/1972 | Polye | 361/434 |
| 3,858,097 | 12/1974 | Polye | 361/283.1 |
| 4,025,942 | 5/1977 | Kurtz | 257/417 |
| 4,261,086 | 4/1981 | Giachino et al. | 29/25.41 |
| 4,384,899 | 5/1983 | Myers | 437/180 |
| 4,415,948 | 11/1983 | Grantham et al. | 361/283.1 |
| 4,432,007 | 2/1984 | Cady | 257/417 |
| 4,495,820 | 1/1985 | Shimada et al. | 73/724 |
| 4,565,096 | 1/1986 | Knecht | 73/718 |
| 4,586,109 | 4/1986 | Peters et al. | 361/283.4 |
| 4,625,561 | 12/1986 | Mikkor | 73/724 |
| 4,701,424 | 10/1987 | Mikkor | 437/209 |
| 4,773,972 | 9/1988 | Mikkor | 156/89 |
| 4,831,492 | 5/1989 | Kuisma | 361/283.4 |
| 4,838,088 | 6/1989 | Murakami | 73/724 |
| 4,875,134 | 10/1989 | Kuisma | 361/283.1 |
| 4,998,179 | 3/1991 | Grantham et al. | 73/724 |
| 5,095,401 | 3/1992 | Zavracky et al. | 361/283 |
| 5,189,916 | 3/1993 | Mizumoto et al. | 73/724 |
| 5,259,247 | 11/1993 | Bantien | 73/718 |
| 5,303,594 | 4/1994 | Kurtz et al. | 73/721 |

FOREIGN PATENT DOCUMENTS

| | | | |
|---|---|---|---|
| 2198611 | 6/1988 | United Kingdom | 73/718 |

*Primary Examiner*—Richard Chilcot
*Assistant Examiner*—Eric S. McCall
*Attorney, Agent, or Firm*—Nicholas C. Hopman

[57] ABSTRACT

A capacitive pressure sensor and method of fabricating the sensor includes providing a layered structure including a second silicon layer (115), a second insulating layer (203, 205) in contact with the second silicon layer (115), a first silicon layer (123) in contact with the second insulating layer (203, 205), a first insulating layer (201) in contact with the first silicon layer (123), and a mask layer (221) in contact with the first insulating layer (201). A major exposed surface (220) of the second silicon layer (115) is provided by mechanically reducing a thickness (210) of the second silicon layer (115) to a predetermined thickness (116). Preferably this is done by grinding and then polishing the second silicon layer (115). In one embodiment a third insulating layer (211) is in contact with the second major surface (220) of the second silicon layer (115). A third silicon layer (101) having a fourth insulating layer (109) forming a perimeter structure (215) positioned above and surrounding a predefined area (114) of the third silicon layer (101). The perimeter structure (215) is bonded to the third insulating layer (211), wherein a chamber (113) is formed between the third insulating layer (211), the perimeter structure (215), and the predefined area (114). Preferably, a portion of the first silicon layer (123) is removed using an anisotropic etch step.

29 Claims, 2 Drawing Sheets

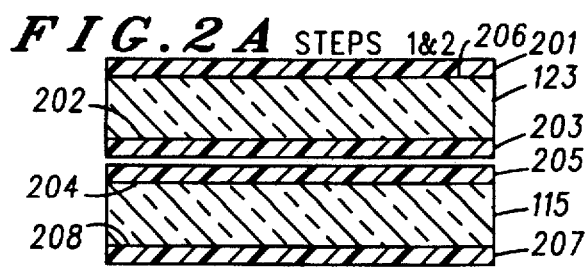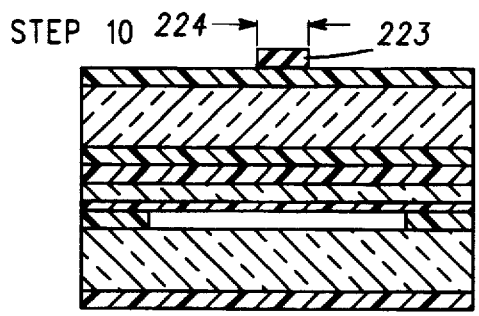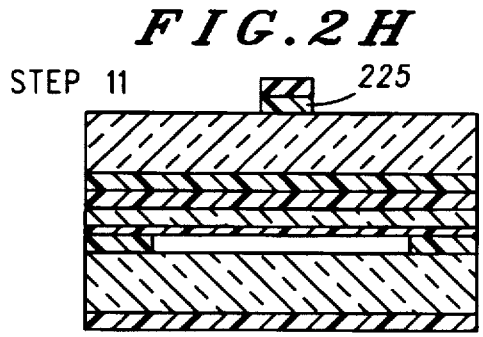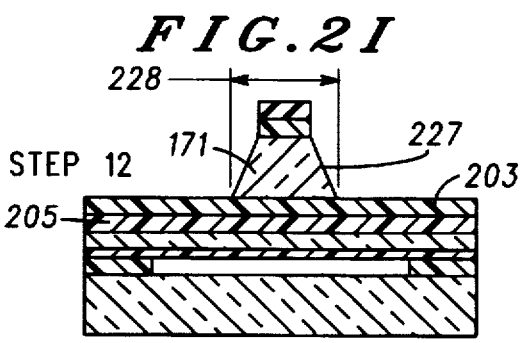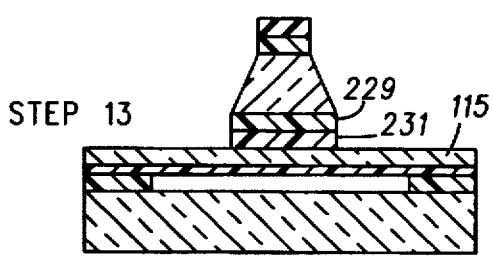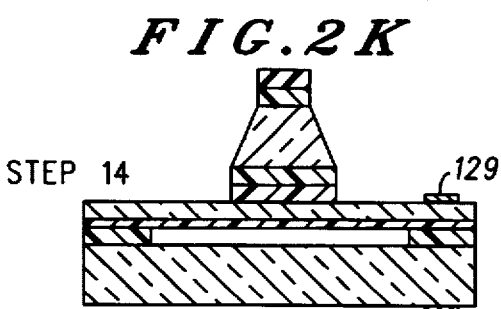

CAPACITIVE PRESSURE SENSOR AND METHOD OF FABRICATING SAME

This is a continuation of application Ser. No. 08/228,626, filed Apr. 18, 1994 and now abandoned.

FIELD OF THE INVENTION

This invention is generally directed to the field of micromachined devices, and specifically for capacitive sensor devices associated with this field.

BACKGROUND OF THE INVENTION

Contemporary capacitive pressure sensors can be grouped into at least two types of distinct architectures, each having their associated fabrication processes. Each of these architectures use a silicon substrate as a first capacitive electrode, separated by another substrate, of either silicon or a metal coated glass substrate, forming a complementary capacitor. Typically, the first silicon electrode forms a diaphragm whose deflection depends on an applied pressure, the flexibility determining a distance between the electrodes—thus a capacitance. To measure absolute pressure, the electrodes are encapsulated within a cavity. This cavity is loaded with a reference pressure, typically a vacuum.

In the case of the glass-silicon structure, an electrical connection for the complementary capacitive electrode, associated with the metal coated glass substrate, must be brought outside of the glass structure to connect it to a measurement circuit. This is typically done by tunneling a conductive feedthrough via through the glass structure. The conductive feedthrough is typically constructed of a metal material. Because the metal is confined within the glass tunnel, and the thermal coefficients of expansion are widely different between the metal and the glass, these type of structures suffer from poor field reliability over large temperature swings due to cracks forming either in the glass or in the metal due to stress formed between the relatively rigid and fragile glass and the relatively deformable metal material. When the cracks form, the reference vacuum pressure can be released thereby adversely effecting the accuracy of the device. This is a well characterized performance of the glass-silicon type of architecture. Further, since the conductive feedthrough adds dimension to the glass-silicon structure, these type of devices are necessarily larger.

On the other hand, those devices based on a silicon-silicon architecture suffer from non-linearity associated with non-uniform geometry of the diaphragm in relation to the complementary capacitive electrode as the diaphragm is deflected during pressure changes. Additionally, it is difficult at best to fabricate a consistent thickness for the flexible diaphragm because of time etch techniques often used to define the flexible diaphragm thickness. In those cases where an etch stop is used to ease processing requirements, the diaphragm is under significant stress because of heavy p-type doping of the silicon required to form the etch stop. This compressive stress makes the diaphragm buckle, thereby prohibiting a manufacturable thin diaphragm. Other etch-stop techniques include a electrochemical one by biasing a p-n junction during etch, which is cumbersome to fabricate. Both etch-stop techniques pose limits to the diaphragm thickness that only a relatively thin diaphragm is obtainable. Both the heavy doping and the p-n junction methods limit the thickness of the diaphragm to a few micrometers, thereby restricting applicable pressure range. Furthermore, silicon becomes fragile with doping-limiting the robustness of the doped diaphragm.

What is needed is an improved capacitive pressure sensor and method for fabricating same, that is more compact, reliable, has a more linear response to pressure changes and is more manufacturable.

BRIEF DESCRIPTION OF THE DRAWINGS

FIG. 2 shows a cross-sectional view of various method steps for fabricating the capacitive pressure sensor shown in FIG. 1.

DETAILED DESCRIPTION OF A PREFERRED EMBODIMENT

A capacitive pressure sensor and method of fabricating the sensor includes bonding three silicon wafers at approximately 1200° C. by using silicon oxide as a bonding agent. At 1200° C. the oxide is sufficiently soft to fuse the silicon layers together. A top silicon layer is used as a rigid center. A thinner middle silicon layer serves as a pressure-sensitive diaphragm. This middle layer is ground and polished mechanically to achieve its thickness. A bottom silicon layer is used as a substrate supporting the whole structure. As mentioned above, silicon oxide layers are disposed between the silicon layers as a bonding agent. Furthermore, the silicon oxide between the top and middle silicon layers is used as an etch stop when the rigid center is formed using anisotropic etch. The oxide between the middle and bottom silicon layers serves as a spacer, providing space for the diaphragm to deflect when pressure is applied.

Figure 1:
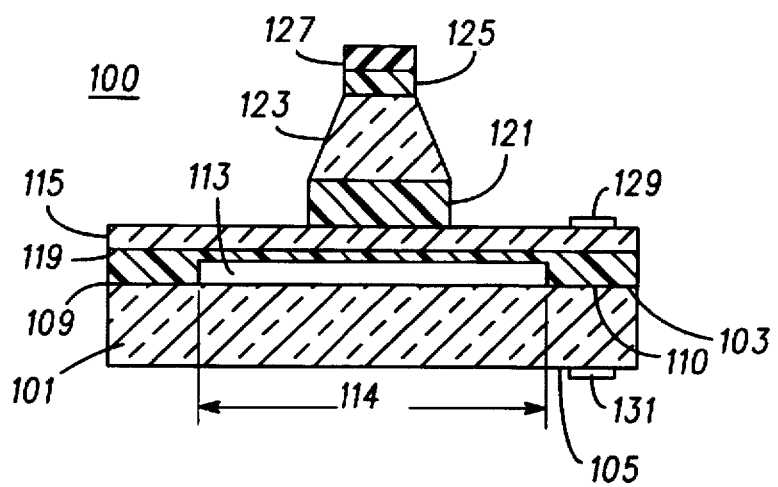
FIG. 1 shows a cross-sectional view of a capacitive pressure sensor in accordance with a preferred embodiment of the invention.

FIG. 1 shows a cross-sectional view of a capacitive pressure sensor constructed using a method in accordance with a preferred embodiment of the invention. FIG. 2 illustrates the various method steps in cross-sectional view for fabricating the capacitive pressure sensor shown in FIG. 1. The details of the method steps will be described first.

In FIG. 2, steps 1 and 2 include providing first and second silicon layers 123, 115, preferably in wafer form. Each of the first and second silicon layers 123, 115 have a layer of insulator disposed thereon. Preferably silicon oxide, shown at reference numbers 201, 203, 205, 207, is grown on a first major surface 202, 204 and on a surface 206, 208 opposing the first major surface 202, 204. The oxide thickness is typically in the order of one micrometer. For robust adhesion properties, required later in the process, the silicon oxide on the major surfaces 203, 205 of the first and second silicon layers 123, 115 are typically polished.

In STEP 3, a bonded interface 209 is formed between the first and second silicon layers 123, 115 by bonding together each of the silicon oxide layers 203, 205 at approximately 1200° C. Preferably, the bonding is effectuated in steam or oxygen ambient.

A thickness dimension of the second silicon layer 115 is then reduced to a predetermined thickness 116, as shown in STEP 4, by removing the oxide layer 207, oriented on the surface 208 opposing the first major surface 204 of the second silicon layer 115, and a portion of the second silicon layer 115. This step of reducing exposes a second major surface 220 on the second silicon layer 115. The method of reducing a thickness 210 of these layers 207, 115 is mechanical grinding and polishing. Typically, the thickness 116 is in a range of about 10 to 200 micrometers and forms the basis of the above-mentioned pressure-sensitive diaphragm structure. STEP 4 represents a significant departure from prior art approaches. These prior art approaches used various etching process to define the thickness of the pressure-sensitive diaphragm. As mentioned in the background section it is difficult at best to fabricate a consistent thickness for the flexible diaphragm using time etch techniques. Also, etch stop techniques using heavy doping induce significant stress on the diaphragm causing it to buckle making relatively thin diaphragm structures impractical. Furthermore, electrochemical methods are cumbersome and render making relatively thicker diaphragm structures required in higher pressure sensory applications impractical. By mechanically reducing these layers 207, 115 first by grinding and then by polishing several benefits result. For instance this technique uses less process time than etch based methods. Also, the grinding and polishing method yields better dimensional definition of the diaphragm. Furthermore, a wide range of pressure applications is possible based on wide range of thicknesses possible by the mechanical reduction method for determination of the diaphragm thickness.

Next, in STEP 5, a thin oxide layer 211, typically ranging from 0.05 to 0.5 micrometers, is then grown on the surface 220 of the second silicon layer 115, wherein the second silicon layer 115 and the oxide layer 211 form a complete diaphragm structure 298. This oxide layer, or third insulating layer 211 is used to form an electrically insulating barrier between the surface 220 of the second silicon layer 115 and the above-mentioned, and yet to be detailed, bottom silicon layer.

In STEP 6, a third, or bottom, silicon layer 101 is provided. Two oxide layers 109, 217 are grown respectively on a third major surface 214 and on a surface 216 opposing the third major surface 214. Note that the oxide layer 109 forms a fourth insulating layer.

In STEP 7, in order to provide a space for the diaphragm 298 to deflect, a predefined volumetric area 114 of the oxide layer 109, oriented adjacent the third major surface 214 of the third silicon layer 101, is removed. The removal of the predefined volumetric area 114 is performed using a well known photolithographic process. This includes screening a photo mask onto a top surface 270 of the oxide layer 109, then etching out the predefined volumetric area 114 of the oxide layer 109 using buffered hydrofluoric acid. This process leaves an exposed surface of uninsulated silicon 218 bounded within a remaining perimeter structure 215 comprised of a portion of the oxide layer 109 in contact a portion 110 of the major surface 214 of the third silicon layer 101 surrounding the exposed surface of uninsulated silicon 218.

In STEP 8, a portion 240 of a fourth major surface 241 of the electrically insulating layer 211 is bonded to the top surface 270 of the perimeter structure 215 oriented on the third silicon layer 101. By doing this a cavity 113 is formed between an unbonded portion 242 of the fourth major surface 241 of the electrically insulating layer 211, the perimeter structure 215, and the exposed surface of uninsulated silicon 218.

All the above-mentioned bonds are formed by fusion at approximately 1200° C. where the silicon oxide is sufficiently soft to bond the various silicon layers together. Alternatively, a low-temperature oxide such as Pyrex can be used. A layer of Pyrex film can be sputtered onto a silicon layer. Layers of silicon can then be bonded electrostatically at approximately 400° C.

As mentioned above the oxide layer 211 was disposed to form an electrically insulating barrier between the surface 220 of the second silicon layer 115 and the exposed surface of uninsulated silicon 218 as the diaphragm 298 structure deflects under pressure. Alternatively, rather than growing the thin oxide layer 211 on the second major surface 220, the oxide layer may be grown on the exposed surface of uninsulated silicon 218 within the well area (the predefined volumetric area 114 of the oxide layer 109) of the third silicon layer 101.

In STEP 9, a masking layer 221, preferably silicon nitride, is then deposited onto a major surface 222 of the silicon oxide layer 201.

In STEP 10, using photolithography and preferably a dry, plasma etch method, the masking layer 221 is patterned to a predetermined area 224 so that it becomes a mask illustrated by reference number 223. This mask 223 is applied next to delimit removal of a portion of the silicon oxide layer 201.

The result of the removal of the portion of the silicon oxide layer 201 is shown in STEP 11. This removal is performed by the well known above-mentioned buffered hydrofluoric acid etch technique. The remaining portion of the silicon oxide layer 201 is shown by reference number 225. The remaining silicon oxide 225 is contained within an area 224 of substantially the same dimension as the predetermined area 224 of the mask 223 provided in the step (STEP 10) of patterning a mask 223.

Next, in STEP 12, a portion of the first silicon layer 123 is removed. Preferably the removal of this portion of the first silicon layer 123 is accomplished using an anisotropic etching method. This leaves a remaining silicon structure 227 bounded within substantially the same dimension as the predetermined area 224 proximate the remaining silicon oxide layer 225 and a larger area 228 adjacent the first major surface 202 of the silicon oxide layer 203. The relationship between the dimensions 224 and 228 bounding the remaining silicon structure 227 is well controlled because as a result of the anisotropic etching a resulting geometry including 4 facets, one facet shown by reference number 171, always form crystalline planes. During the anisotropic etch step, the silicon oxide layer 203 serves as an etch stop. By using the silicon oxide layer 203 as an etch stop process time is minimized. Also, due to both the use of the silicon oxide layer 203 as an etch stop and the well defined geometrical relationship of the crystalline planes accurate dimensional definition of the resulting structure is possible.

In STEP 13 the second silicon layer 115 is partially exposed so that it can be electrically connected to external signal conditioning circuits. This is accomplished by etching an additional portion of the silicon oxide layers 203 and 205. The remaining portions 229 and 231 are substantially bounded within the larger area 228 associated with the remaining silicon structure 227.

Then, in STEP 14, selective areas of each of the exposed surfaces of each of the second and third silicon layers are metalized to form electrically conductive contact pads 129 and 131. These electrically conductive contact contact, are bonding, pads 129 and 131 may be disposed for instance by sputtering a pad 129 onto a first surface 119 of the flexible silicone layer 115, and a pad 131 onto an opposing second surface 105 of the third silicone layer 101. The final structure is shown in FIG. 1.

In FIG. 1 the second and third silicon layers 115 and 101 act as opposing plates of a capacitor. The second silicon layer 115 is relatively flexible, and the third silicon layer 101 is relatively rigid. When an increase in pressure difference is applied between these layers 115 and 101, the opposing plates of the capacitor approach each other. This causes the capacitance of the structure to increase. This is typically measured across the electrically conductive contact pads 129 and 131.

A rigidizing structure comprised of elements 127, 125, 123, and 121 is used to improve the linearity of a change in capacitance of the sensor 100 due to a change in pressure. These elements 127, 125, 123, and 121 provide a stiffening action so that the diaphragm 298 structure does not bow as much when an increasing pressure is provided between the opposing plates of the capacitor. Preferably, the layered rigidizing structure is located proximate a center position with relationship to a perimeter of the first surface 103 of the rigid third silicon layer 101.

Figure 3:
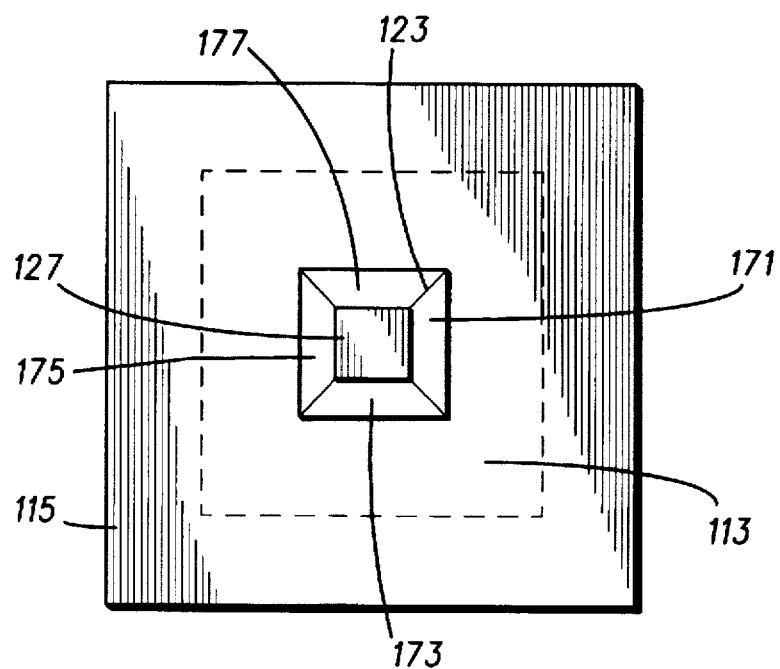
FIG. 3 shows a top view of the capacitive pressure sensor shown in FIG. 1 highlighting an orientation of a rigidizing member.

FIG. 3 shows a top view of the capacitive pressure sensor shown in FIG. 1 highlighting a preferred orientation of the rigidizing member. Since this is a top view only elements 127, 171, 173, 175, and 177 of the rigidizing structure are visible. Reference numbers 171, 173, 175, and 177 illustrate the above-described 4 facets of the first silicon layer 123. The chamber 113 is shown delimited by dashed lines and the second silicon layer 115 is also shown.

In conclusion, method steps for fabricating an improved capacitive pressure sensor have been taught above. The preferred embodiment uses mechanical grinding then polishing to define the diaphragm thickness. Furthermore, the usage of an oxide layer as an etch stop in combination with wafer bonding techniques allows a wider range of diaphragm thickness. These steps produce a sensor that is more compact, reliable, has a more linear response to pressure changes and is more manufacturable than prior art solutions.

What is claimed is:

1. A method of fabricating a capacitive pressure sensor, the method comprising the steps of:

providing first and second silicon layers (123, 115), wherein each of the first and second silicon layers (123, 115) have an insulating layer (201, 203, 205, 207) respectively in contact with a first major surface (202, 204) and on a surface (206, 208) opposing the first major surface (202, 204);

mechanically reducing a thickness (210) of the second silicon layer (115) to a predetermined thickness (116) wherein the step of mechanically reducing exposes a second major surface (220) on the second silicon layer (115);

disposing a third insulating layer (211) onto the second major surface (220 of the second silicon layer (115);

providing a third silicon layer (101) having a fourth insulating layer (109) in contact with a portion (110) of a major surface (214) of the third silicon layer, wherein the fourth insulating layer (109) forms a perimeter structure (215) surrounding a predefined area (114) on the major surface (214) of the third silicon layer (101); and bonding a top surface (270) of the perimeter structure (215) to the third insulating layer 211 oriented on the second silicon layer (115), wherein a chamber (113) is formed between the third insulating layer (211), the perimeter structure (215), and the predefined area (114).

2. A method in accordance with claim 1 further comprising a step of removing a portion of the first silicon layer (123), using an anisotropic etch step.

3. A method in accordance with claim 1 wherein the insulating layer (201, 203, 205, 207) respectively in contact with each of the first and second silicon layers (123, 115) has a thickness of less than five micrometers.

4. A method in accordance with claim 1 wherein the step of bonding a portion (240) of a fourth major surface (241) of the third insulating layer (211) to the perimeter structure (215) oriented on the third silicon layer (101) comprises fusing the third insulating layer to the perimeter structure (115) associated with the third silicon layer (101).

5. A method in accordance with claim 1 wherein the step of bonding a portion (240) of a fourth major surface (241) of the third insulating layer (211) to the perimeter structure (215) oriented on the third silicon layer (101) comprises electrostatically bonding the fourth major surface (240) of the third insulating layer (211), to the perimeter structure (115) associated with the third silicon layer (101).

6. A method in accordance with claim 1 wherein the step of forming a rigidizing structure by removing portions of the first silicon layer (123) comprises a step of removing portions of the first silicon layer (123) using an anisotropic etch step.

7. A method in accordance with claim 1 wherein the step of forming a rigidizing structure by removing portions of the mask layer (221) comprises a step of forming a rigidizing structure by removing portions of the mask layer (221) using a dry etch method.

8. A method in accordance with claim 7 wherein the step of forming a rigidizing structure by removing portions of the mask layer (221) using a dry etch method comprises a step of forming a rigidizing structure by removing portions of the mask layer (221) using a plasma etch method.

9. A method in accordance with claim 1 further comprising a step of metalizing selective surface areas of each of the second and third silicon layers (115, 101) to form conductive contact pads (129, 131).

10. A method in accordance with claim 1 wherein the step of providing a first silicon layer comprises providing a first silicon layer having a thickness more than twenty times thicker than the insulating layer provided in the step of providing first and second silicon layers (123, 115), having an insulating layer (201, 203, 205, 207) respectively in contact with a first major surface (202, 204) and on a surface (206, 208) opposing the first major surface (202, 204).

11. A method in accordance with claim 1 wherein the step of mechanically reducing comprises a step of grinding.

12. A method in accordance with claim 11 wherein the step of grinding includes a step of polishing.

13. A method of fabricating a capacitive pressure sensor, the method comprising the steps of:

providing first and second silicon layers (123, 115), wherein each of the first and second silicon layers (123, 115) have an insulating layer (201, 203, 205, 207) respectively in contact with a first major surface (202, 204) and on a surface (206, 208) opposing the first major surface (202, 204);

forming a bonded interface (209) positioned between the first and second silicon layers (123, 115) by bonding together each of the insulating layers (203, 205) oriented on each of the major surface's (202, 204) of each of the first and second silicon layers (123, 115);

removing the insulating layer (207) oriented on the surface (208) opposing the first major surface (204) of the second silicon layer (115), and mechanically reducing the second silicon layer (115) to a predetermined thickness (116), wherein the step of removing and reducing exposes a second major surface (220) on the second silicon layer (115);

disposing an electrically insulating layer (211) on the second major surface (220) of the second silicon layer (115), wherein the second silicon layer (115) and the electrically insulating layer (211) form a diaphragm structure (298);

providing a third silicon layer (101) having first and second insulating layers (109, 217) respectively in contact with a third major surface (214) and on a surface (216) opposing the third major surface (214);

removing a predefined volumetric area (114) of the insulating layer (109) oriented adjacent the third major surface (214) of the third silicon layer (101) leaving an exposed surface of uninsulated silicon (218) bounded within a perimeter structure (215) comprised of a portion of the insulating layer (109) surrounding the exposed surface of uninsulated silicon (218);

bonding a portion (240) of a fourth major surface (241) of the electrically insulating layer (211), indigenous to the diaphragm structure (298), to the perimeter structure (215) oriented on the third silicon layer (101), wherein the bonding step forms a cavity (113) encapsulated between an unbonded portion (242) of the fourth major surface (241) of the electrically insulating layer (211), the perimeter structure (215), and the exposed surface (218) of uninsulated silicon (218);

disposing a mask layer (221) onto a major surface (222) opposing the surface (206) that opposes the major surface (202) of the first silicon layer (123); and forming a rigidizing structure by removing portions of the mask layer (221), the insulating layer (201) oriented on the surface (206) opposing the first major surface (202) of the first silicon layer (123), the insulating layer (203) oriented on the first major surface (202) of the first silicon layer (123), and the insulating layer (205) oriented of the first major surface (204) of the second silicon layer (115), wherein the step of removing exposes a major portion of the major surface (204) of the second silicon layer (115).

14. A method in accordance with claim 13 wherein the step of removing and reducing comprises a step of grinding.

15. A method in accordance with claim 13 wherein the insulating layer respectively in contact with each of the first and second silicon layers has a thickness of less than five micrometers.

16. A method in accordance with claim 13 wherein the step of bonding a portion of a fourth major surface of the electrically insulating layer, indigenous to the diaphragm structure, to the perimeter structure oriented on the third silicon layer comprises fusing the electrically insulating layer, indigenous to the diaphragm structure, to the perimeter structure associated with the third silicon layer.

17. A method in accordance with claim 13 wherein the step of bonding a portion of a fourth major surface of the electrically insulating layer, indigenous to the diaphragm structure, to the perimeter structure oriented on the third silicon layer comprises electrostatically bonding the fourth major surface of the electrically insulating layer, indigenous to the diaphragm structure, to the perimeter structure associated with the third silicon layer.

18. A method in accordance with claim 13 wherein the step of forming a rigidizing structure by removing portions of the first silicon layer comprises a step of removing portions of the first silicon layer using an anisotropic etch step.

19. A method in accordance with claim 13 wherein the step of forming a rigidizing structure by removing portions of the mask layer comprises a step of forming a rigidizing structure by removing portions of the mask layer using a dry etch method.

20. A method in accordance with claim 17 wherein the step of forming a rigidizing structure by removing portions of the mask layer using a dry etch method comprises a step of forming a rigidizing structure by removing portions of the mask layer using a plasma etch method.

21. A method in accordance with claim 13 further comprising a step of metalizing selective surface areas of each of the second and third silicon layers to form conductive contact pads.

22. A method in accordance with claim 13 wherein the step of providing a first silicon layer comprises providing a first silicon layer having a thickness more than twenty times thicker than the insulating layer provided in the step of providing first and second silicon layers, having an insulating layer disposed thereon.

23. A method of fabricating a capacitive pressure sensor, the method comprising the steps of:

providing first and second silicon layers, wherein each of the first and second silicon layers have an insulating layer respectively in contact with a first major surface and on a surface opposing the first major surface;

forming a bonded interface positioned between the first and second silicon layers by bonding together each of the insulating layers oriented on each of the major surface's of each of the first and second silicon layers;

mechanically removing the insulating layer oriented on the surface opposing the first major surface of the second silicon layer, and reducing the second silicon layer to a predetermined thickness, wherein the step of mechanically removing and reducing exposes a second major surface on the second silicon layer;

disposing an electrically insulating layer on the second major surface of the second silicon layer, wherein the second silicon layer and the electrically insulating layer form a diaphragm structure;

providing a third silicon layer having first and second insulating layers respectively in contact with a third major surface and on a surface opposing the third major surface;

removing a predefined volumetric area of the insulating layer oriented adjacent the third major surface of the third silicon layer leaving an exposed surface of uninsulated silicon bounded within a perimeter structure comprised of a portion of the insulating layer surrounding the exposed surface of uninsulated silicon;

bonding a portion of a fourth major surface of the electrically insulating layer, indigenous to the diaphragm structure, to the perimeter structure oriented on the third silicon layer, wherein the bonding step forms a cavity encapsulated between an unbonded portion of the fourth major surface of the electrically insulating layer, the perimeter structure, and the exposed surface of uninsulated silicon;

patterning a mask onto the insulating layer oriented on a surface opposing the bonded interface of the first silicon layer, wherein the mask is defined by a predetermined area;

removing a portion of the insulating layer associated with the surface opposing the bonded interface of the first silicon layer, the remaining insulating layer contained within an area of substantially the same dimension as the predetermined area of the mask provided in the step of patterning a mask;

removing a portion of the first silicon layer, leaving a remaining silicon structure bounded within substantially the same dimension as the predetermined area of the mask provided in the step of patterning a mask proximate the remaining insulating layer and a larger area adjacent the first major surface of the insulating layer; and removing an additional portion of the insulating layers associated with the bonded interface positioned between the first and second silicon layers, wherein the remaining portion is substantially bounded within the larger area associated with the remaining silicon structure.

24. A method in accordance with claim 23 wherein the step of removing and reducing comprises a step of grinding and polishing.

25. A method in accordance with claim 24 wherein the insulating layer respectively in contact with each of the first and second silicon layers is an oxide layer having a thickness of less than five micrometers.

26. A method in accordance with claim 25 wherein the step of bonding a portion of a fourth major surface of the electrically insulating layer, indigenous to the diaphragm structure, to the perimeter structure oriented on the third silicon layer comprises fusing the electrically insulating layer, indigenous to the diaphragm structure, to the perimeter structure associated with the third silicon layer.

27. A method in accordance with claim 25 wherein the step of bonding a portion of a fourth major surface of the electrically insulating layer, indigenous to the diaphragm structure, to the perimeter structure oriented on the third silicon layer comprises electrostatically bonding the fourth major surface of the electrically insulating layer, indigenous to the diaphragm structure, to the perimeter structure associated with the third silicon layer.

28. A method in accordance with claim 23 wherein the step of removing a portion of the first silicon layer (123) comprises a step of removing a portion of the first silicon layer (123) using an anisotropic etch step.

29. A method in accordance with claim 28 further comprising a step of metalizing selective areas of each of the exposed surfaces of each of the second and third silicon layers to form conductive contact pads.

* * * * *

UNITED STATES PATENT AND TRADEMARK OFFICE
CERTIFICATE OF CORRECTION

PATENT NO. : 5,744,725
DATED : April 28, 1998
INVENTOR(S) : Chen, et al.

It is certified that error appears in the above-indentified patent and that said Letters Patent is hereby corrected as shown below:

Column 5, line 49 reads "major surface (220 of the second" should be -- major surface (220) of the second--.

Column 5, line 58, reads "the third insulating layer 211 oriented" should be --the third insulating layer (211) oriented--.

Signed and Sealed this

Twenty-second Day of September, 1998

Attest:

BRUCE LEHMAN

Attesting Officer

Commissioner of Patents and Trademarks